Dec. 22, 1942. G. H. SCHIEFERSTEIN 2,305,814
SPRING COUPLING MEMBER
Filed Oct. 14, 1939 2 Sheets-Sheet 1

A-B

A-B

C-D

C-D

Inventor:
Georg Heinrich Schieferstein
By [signature]
his Atty.

Dec. 22, 1942.  G. H. SCHIEFERSTEIN  2,305,814
SPRING COUPLING MEMBER
Filed Oct. 14, 1939  2 Sheets-Sheet 2
Fig. 8
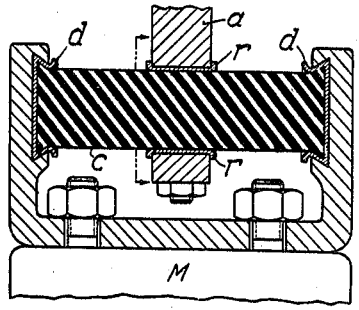
Fig. 9
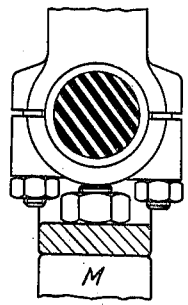
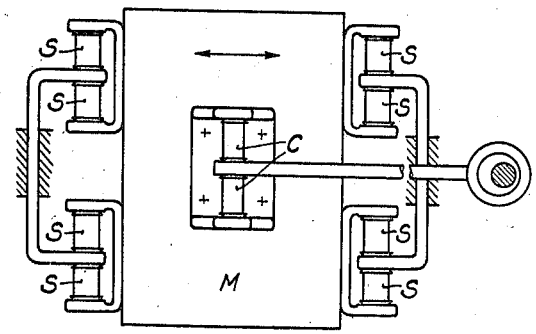
Fig. 10
Fig. 11
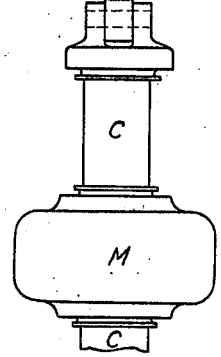
Fig. 12
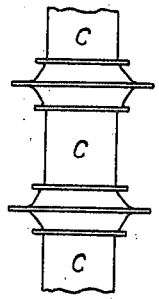
Inventor:
Georg Heinrich Schieferstein
By [signature]
his ATTY.

Patented Dec. 22, 1942

2,305,814

UNITED STATES PATENT OFFICE 2,305,814

SPRING COUPLING MEMBER

Georg Heinrich Schieferstein, Finowfurt, near Eberswalde, Germany; vested in the Alien Property Custodian Application October 14, 1939, Serial No. 299,423
In Germany September 15, 1938

1 Claim. (Cl. 267—63)

This invention relates to an improved spring coupling member for use with resonance oscillating machines, suspensory systems and the like.

It is known to fasten resilient media of rubber or similar substances adhesively to metal members and then to subject these rubber bodies to tensile, compressive or shearing stresses.

Now rubber, as such, bears relatively high stresses, but the adhesive fastening, depending on the structural arrangement, does not withstand these loads as a rule, even in the case of the best methods known at the present time, particularly at higher frequencies.

One aim of the invention is to provide new and improved means for fastening rubber or other resilient material in cylindrical, prismatic or other shape, to metals.

Another object of the invention is to fasten rubber or other resilient materials to metals at least partly by means of adhesion.

A further object of the invention is to employ such means for fastening rubber to metal in the coupling devices of resonance oscillating machines.

Further objects of the invention will become apparent as the description thereof proceeds.

In order that the invention may be more clearly understood, reference is made to the accompanying drawings, which illustrate diagrammatically and by way of example, some embodiments of the invention in application to coupling devices for resonance oscillating machines.

In said drawings:

Figs. 8 and 9 show the embodiment in which only one rubber prism or one rubber cylinder is used, which is fastened at both end faces to a dovetail socket plate and is deflected in the middle by the one adhesively fastened annular body.

Fig. 9 shows the corresponding cross-section when using a rubber cylinder.

Fig. 10 shows a complete, vibratable loosely coupled structure.

Fig. 11 shows a rubber body which is subjected to tensile and compressive stresses and gripped at both end faces by dovetail-shaped socket plates, and Fig. 12 is an elevated view showing a portion of a modified rubber body.

Figure 2:
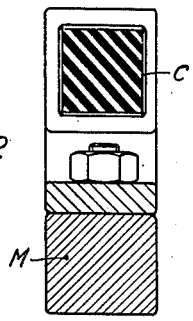
Fig. 2 is a section AB transversely through a quadrangular rubber prism of this coupling device, of the mass M and of the fastening of the two.
Figure 3:
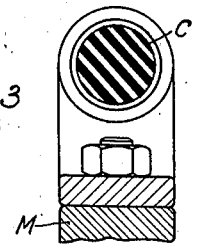
Fig. 3 is the same section AB when using a cylindrical rubber shape instead of a prismatic one.
Figure 1:
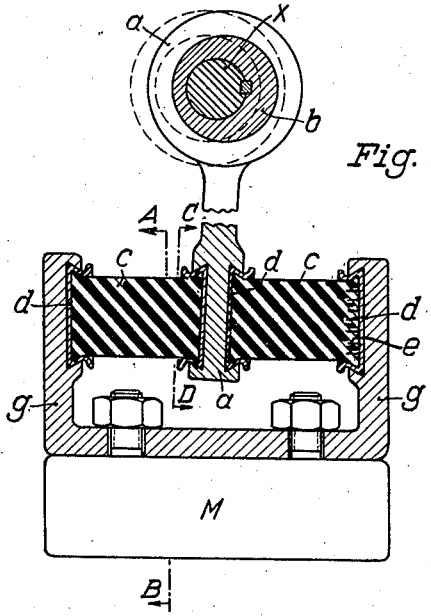
Fig. 1 represents a coupling device in a resonance machine.

In Fig. 1, $a$ is an eccentric rod which is vertically reciprocated by an eccentric ring keyed on to the shaft $x$ and thereby deflects the prismatic rubber bodies $c$, $c$.

The eccentric rod may be made shorter or longer, as required.

The rubber bodies $c$, $c$ are held fast by the metal socket plates $d$, $d$, to the inside of which they are adhesively secured, and are periodically subjected to shearing stress by the reciprocating or vibrating eccentric $a$, $b$.

If the rubber prisms were only adhesively secured at the end faces to metal, they would gradually become detached at the point subjected to the greatest stress and, whenever a small separation had occurred at any most highly stressed part, this detaching would rapidly progress and lead to the complete detachment of the rubber from the metal surface.

But as in the case of the present invention the quadrangular prismatic socket plate encloses the rubber on all four sides in dovetail fashion, and as the corners of this socket plate can be welded together before accommodating the rubber, detachment of the rubber inside the socket is impossible, because, on the one hand, the cross-section is there enlarged in dovetail shape and does not participate in the bending and shearing effect, and because the stressing only acts outside the socket where the full supporting cross-section of the rubber is subjected freely in space to shearing stress and not to a stress tending to detach it from metal surfaces.

The expedients of employing a thin layer of hard rubber within the socket plate, adhesively fastening the same directly to metal and allowing said layer only to merge into the rubber may also be employed in this arrangement, or of disposing metal lamellae $e$ welded on to the sockets to engage in the rubber inside the socket, in order still further to increase the adhesive surface and hence the adhesive powers of the rubber.

The lamellae may be employed longitudinally or transversely to the effective forces, as required, or else be employed in the form of quadratic lattices. The socket plates are fastened, in the embodiment shown in Fig. 4, by cutting away the eccentric rod $a$, on the one hand, and the supporting frame $g$, on the other hand, as shown in Fig. 1, for example, in dovetail form in such a manner that when the socket plates $d$, $d$ are inserted two lugs $i$, $i$ project sideways in the eccentric rod $a$ or the arms of the frame $g$, which are bent or riveted around the dovetail-shaped socket plate $d$.

Figure 4:
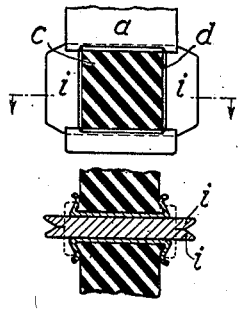
Fig. 4 shows the dovetail-shaped fastening in side view and plan before the riveting, and Fig. 5 after the riveting.
Figure 5:
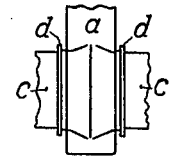

In Fig. 4 the lugs $i$ are shown in plan and in cross-section, unriveted, and in Fig. 5 in the riveted state.

Figure 6:
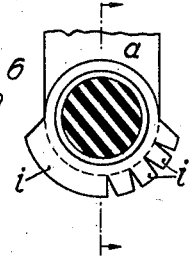
Figs. 6 and 7 show the circular mount before the riveting.
Figure 7:
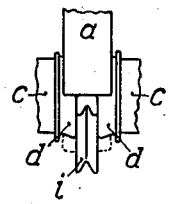

Appropriately, Figs. 6 and 7 illustrate how the dovetail-shaped socket plate $d$ is inserted in the upper portion of the eccentric rod $a$ and the lower portion is gripped by riveting round the lugs $i$, $i$.

The lug $i$ may be brought into its final form by riveting either in the divided or undivided state.

In Fig. 8 a single prism is gripped at the end faces by the socket plates $d$, $d$ and in the middle by a pushed-on ring $r$, which can also be secured by adhesion.

The remarks made in respect of Figs. 1 to 7 also apply hereto, moreover, but with the difference that the ring $r$ is firmly clamped, after the style of a bearing, by the connecting rod $a$, as shown in Fig. 9.

From Fig. 10 it can be seen that the device described and illustrated can be employed both for collective springs for vibrating systems and for coupling springs for vibrating arrangements.

The collective springs $s$, $s$, which in the aggregate, as shown in Fig. 10, generally have to take in all greater idle power, are as a rule for that reason also generally of heavier dimensions than the coupling springs $c$, $c$ Fig. 10.

In the present case, in Fig. 10, the substantially greater resistance of the collective springs occurring in their aggregate is also seen from the fact that they are used in quadruplicate and are disposed in parallel, whereas only one single pair of coupling springs is employed, which are of smaller dimensions and which are allotted the task of energising this system through an eccentric or connecting rod.

In this arrangement it is also to be taken into account that the coupling spring, particularly when the vibratable structure is brought to rest, on occasion is displaced from the phase shift of about 90° during operation to a phase shift of 180°, if the disconnected motor comes to a standstill substantially more rapidly than the vibratable system, the effect of which is that the coupling spring has on occasion to withstand twice as great a deflection as the collective spring.

This relatively great deflection which the present construction withstands, in the first place, and the light weight (light metal) of the connecting or eccentric rod employed, in the second place, and, in the third place, the fact that the present spring construction has a zero position, after the style of steel springs, that is to say, like the latter, can be subjected to tensile and compressive stress, are advantages of the present invention which most rubber spring constructions, to sum up, do not unite together.

The hereindescribed spring is naturally also utilisable, however, in all other positions where resilient media are used for the suspension of vehicles and other apparatus and machines.

In Fig. 11, in which M denotes the mass, $c$ the prism, $a$ the eccentric rod, K the crank and $l$ the crank bearing, it is shown how springs of the type described are also mounted in metal socket plates in the case of rubber springs as described and illustrated, and can be subjected to tensile and compressive stresses.

In the case of high frequencies or in the case of stresses which necessitate a short heat path within the rubber, the prismatic rubber bodies can be subdivided by adhesively fastening or inserting, at certain intervals, two socket plates riveted together and/or welded and widened in dovetail shape, between each two short prisms (Fig. 12).

The socket plates then act as coolers by shortening the path of the heat.

I claim:

A coupling between a load mass and a reciprocating element, comprising an elongated rubber coupling member extending perpendicularly to the direction of reciprocation of said element, two lipped socket plates, the ends of said rubber member being dovetailed into and adhered to said socket plates and said socket plates being dovetailed into sockets in said load mass, and means securing said rubber member midway of its length rigidly to said reciprocating element.

GEORG HEINRICH SCHIEFERSTEIN.